(No Model.)
J. H. & T. D. MORRIS.
WATER ELEVATOR.
No. 320,157. Patented June 16, 1885.
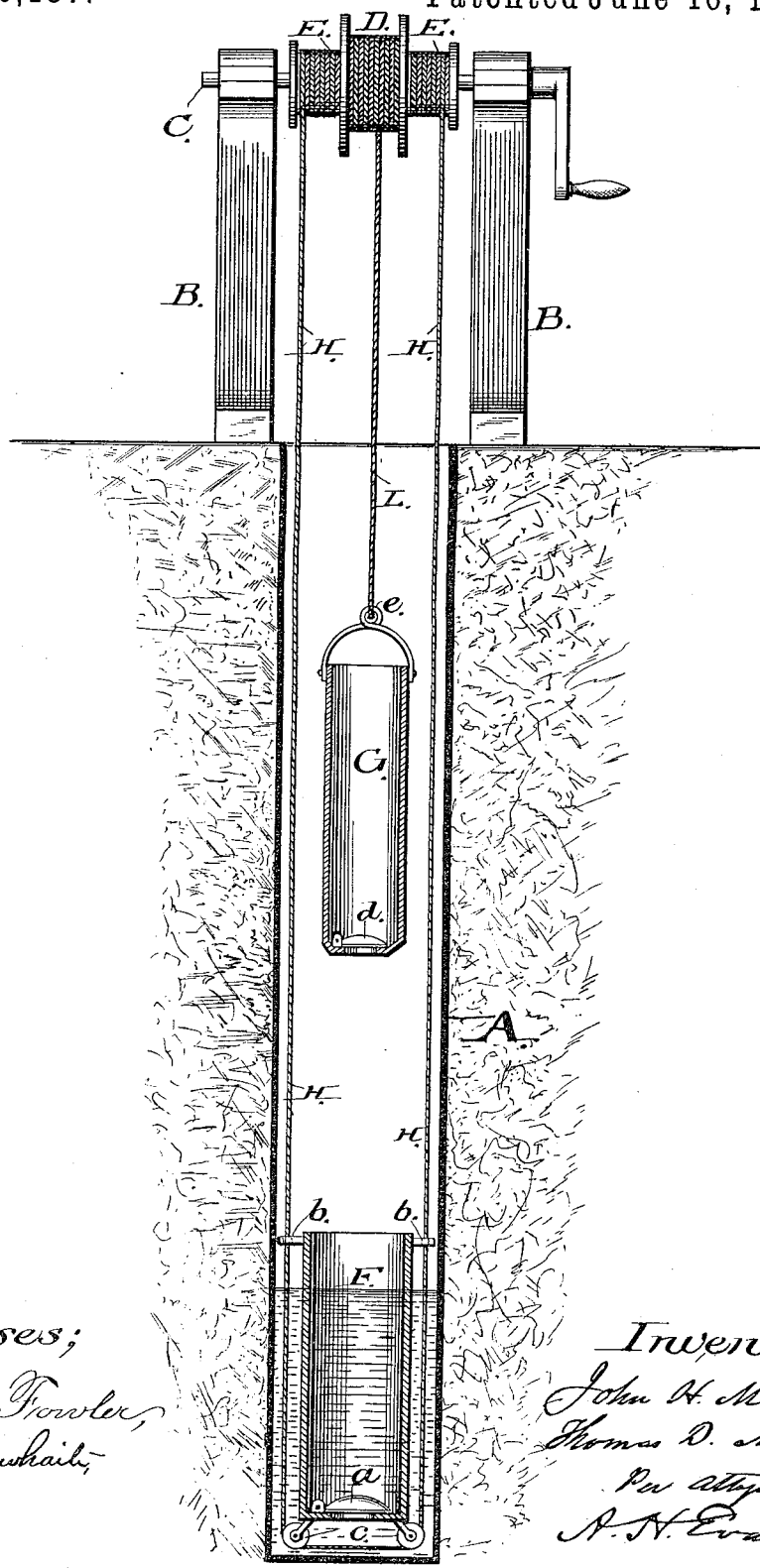
Witnesses;
T. Walter Fowler
H. B. Applewhaite
Inventors;
John H. Morris
Thomas D. Morris
Per Atty.
A. H. Evans & Co.

UNITED STATES PATENT OFFICE.

JOHN H. MORRIS AND THOMAS D. MORRIS, OF SEWARD, NEBRASKA.

WATER-ELEVATOR.

SPECIFICATION forming part of Letters Patent No. 320,157, dated June 16, 1885.

Application filed November 1, 1884. (No model.)

*To all whom it may concern:*

Be it known that we, JOHN H. MORRIS and THOMAS D. MORRIS, citizens of the United States, residing at Seward, in the county of Seward and State of Nebraska, have invented certain new and useful Improvements in Water-Elevators, of which the following is a full, clear, and exact description, reference being had to the accompanying drawing, forming part of this specification, in which the figure represents a vertical sectional view of our improved apparatus.

Similar letters of reference indicate corresponding parts.

Our invention relates to an improved apparatus for raising water from a well or other source of supply; and it consists in two buckets provided with suitable valves, whereby one of the buckets enters and receives water from the other bucket, the two buckets moving in opposite directions by reason of ropes or chains passing around suitable drums; and our invention further consists in the arrangement, construction, and combination of devices, all of which will be hereinafter fully set forth, and specifically pointed out in the claims.

To enable others skilled in the art to make and use our invention, we will now proceed to describe the exact manner in which we have carried it out.

Referring to the said drawing, A represents a tube driven or sunken in the ground in the usual manner, and B a suitable frame-work adapted to furnish bearings for a shaft, C, which is mounted in its upper portion, the said shaft being provided with a crank or handle, to which power is applied to operate the buckets.

Upon the shaft C, and between the sides of the frame, are mounted drums or sheaves D and E, the latter being made smaller in diameter than the former, in order that the same may have the fastest travel.

Within the tube A and located near its bottom, is a bucket, F, which receives water from the tube through a suitable valve, *a*, in its bottom. This valve closes when the requisite amount of water has passed into the lower bucket, and the latter is raised and opens in its descent by the pressure of the water acting upon it.

As before stated, the drum D is somewhat larger in diameter than the drum E, and it is preferably placed in the center of the shaft C, and between the drums E. A suitable rope or chain, H, passes around the drums E and extends downward into the tube through guides *b* on the lower bucket, and under suitable pulleys or small rollers, *c*, secured on its bottom in such manner that all side movement is counteracted by these rollers during the rise and descent of the lower bucket.

The upper bucket, G, as before stated, is of such form and size that it may be readily passed into the lower bucket, and it receives the water from the lower bucket through a valve, *d*, which closes when the bucket G ascends. By this ascent of bucket G is accomplished the winding of a rope or chain, L, secured to a bail, *e*, on the bucket G, and to the drum D.

From the foregoing description it will be readily seen that by suspending the two buckets, one at or near the bottom of the tube and one near the top of the same, and both being connected by the ropes to a single shaft, but wound in opposite directions, the revolution of the said shaft will cause the lower bucket to ascend and the upper bucket to descend until the two come in contact, and the upper or smaller one enters the lower one. The resistance of the water in the lower bucket will open the valve in the upper bucket and allow the water to flow into the latter, when the motion of the shaft is reversed and the water brought to the surface by the ascent of said bucket, the lower bucket in the meantime being caused to descend by the unwinding of its rope, and receive a fresh supply of water from the well or tube.

By this construction we are also enabled to prevent the accumulation of filth within the well, and small animals are prevented from falling into the water, as any animal or substance falling into the tube will be caught by the lower bucket, and the condition of the water easily ascertained by occasionally raising the lower bucket, when any foreign matter may be removed.

The application of rollers on the bottom of the lower bucket enables us to draw the bucket with two ropes, or one rope with both ends united to the drums E, and by this means avoid friction, and also to allow the bucket to adjust itself in case one rope or end is wound faster than the other.

Having thus fully described our invention, what we claim as new, and desire to secure by Letters Patent, is—

1. In a water-elevator, the bucket F, with its valve $a$, rollers $c$, and guides $b$, in combination with a bucket, G, of smaller diameter, and a drum and ropes connected to the buckets, whereby the said buckets approach each other, the upper one displacing and receiving the contents of the lower one, substantially as herein described.

2. In a water-elevator, the bucket F, with a valve in its bottom, and suitable pulleys or rollers, $c$, in combination with the bucket G, the cord or chain H, drums upon each side of a central drum, and a crank or handle for raising and lowering said bucket, substantially as described.

3. In a water-elevator, the bucket G, with its valve $d$ and bail $e$, in combination with the bucket F, whose diameter is greater than that of the bucket G, a rope or chain, L, a central drum, and a mechanism for winding the ropes L and H, to cause the buckets F and G to approach each other, substantially as herein described.

4. A water-elevator comprising the following elements: a lower bucket with a valve to receive water from the source of supply, an upper bucket of smaller diameter with a valve in its bottom, suitable guides and rollers on the lower bucket, cords or chains attached to both buckets and wound around drums in opposite directions, so that the buckets approach each other, the upper one receiving water from the lower one by the continued descent of the former, and a shaft for imparting motion to both buckets, substantially as described.

JOHN H. MORRIS.
THOMAS D. MORRIS.

Witnesses:
R. P. ANDERSON,
W. S. LEITER.